US009760455B2

United States Patent
Lee et al.

(10) Patent No.: US 9,760,455 B2
(45) Date of Patent: Sep. 12, 2017

(54) PCIE NETWORK SYSTEM WITH FAIL-OVER CAPABILITY AND OPERATION METHOD THEREOF

(71) Applicant: Industrial Technology Research Institute, Hsinchu (TW)

(72) Inventors: Chao-Tang Lee, Pingtung County (TW); Cheng-Chun Tu, Hsinchu County (TW); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 136 days.

(21) Appl. No.: 14/983,580

(22) Filed: Dec. 30, 2015

(65) Prior Publication Data
US 2017/0147456 A1 May 25, 2017

(30) Foreign Application Priority Data
Nov. 25, 2015 (TW) .............................. 104139259 A

(51) Int. Cl.
G06F 11/07 (2006.01)
G06F 11/20 (2006.01)
(Continued)

(52) U.S. Cl.
CPC ...... G06F 11/2033 (2013.01); G06F 11/1417 (2013.01); G06F 11/1423 (2013.01);
(Continued)

(58) Field of Classification Search
CPC ............. G06F 11/2002; G06F 11/2005; G06F 11/2007; G06F 11/2017
(Continued)

(56) References Cited

U.S. PATENT DOCUMENTS 7,313,637 B2   12/2007   Tanaka et al.
8,176,204 B2    5/2012   Riley
(Continued)

FOREIGN PATENT DOCUMENTS

CN   101884208   11/2010
TW   200513844    4/2005
(Continued)

OTHER PUBLICATIONS

Regula et al., "Implementing Intelligent Adapters and Multi-Host Systems With PCI Express™ Technology," PCI Express System Architecture, Sep. 30, 2003, pp. 999-1012.
(Continued)

Primary Examiner — Chae Ko
(74) Attorney, Agent, or Firm — Jianq Chyun IP Office

(57) ABSTRACT

A Peripheral Component Interconnect Express (PCIe) network system with fail-over capability and an operation method thereof are provided. The PCIe network system includes a management host, a PCIe switch, a first non-transparent bridge, and a second non-transparent bridge. The upstream port of the PCIe switch is electrically coupled to the management host. The first non-transparent bridge is disposed in the PCIe switch for electrically coupling to the first PCIe port of a calculation host. The first non-transparent bridge can couple the first PCIe port of the calculation host to the management host. The second non-transparent bridge is disposed in the PCIe switch for electrically coupling to the second PCIe port of the calculation host. The second non-transparent bridge can couple the second PCIe port of the calculation host to the management host.

42 Claims, 4 Drawing Sheets

(51) Int. Cl.
G06F 13/40 (2006.01)
G06F 13/42 (2006.01)
G06F 11/14 (2006.01)

(52) U.S. Cl.
CPC ...... *G06F 11/2007* (2013.01); *G06F 11/2017* (2013.01); *G06F 13/404* (2013.01); *G06F 13/4022* (2013.01); *G06F 13/4282* (2013.01)

(58) Field of Classification Search
USPC .......................................................... 714/4.5
See application file for complete search history.

(56) References Cited

U.S. PATENT DOCUMENTS

| | | | |
|---|---|---|---|
| 8,645,746 | B2 | 2/2014 | Buckland et al. |
| 8,645,747 | B2 | 2/2014 | Buckland et al. |
| 8,677,176 | B2 | 3/2014 | Buckland et al. |
| 8,677,180 | B2 | 3/2014 | Bayer et al. |
| 8,799,702 | B2 | 8/2014 | Buckland et al. |
| 2004/0098501 | A1 | 5/2004 | Finn |
| 2009/0063894 | A1 | 3/2009 | Billau et al. |
| 2009/0248947 | A1 | 10/2009 | Malwankar et al. |
| 2010/0312943 | A1 | 12/2010 | Uehara et al. |
| 2011/0202701 | A1* | 8/2011 | Maitra ................ G06F 13/4022 710/308 |
| 2012/0137042 | A1 | 5/2012 | Wang |
| 2013/0086336 | A1* | 4/2013 | Canepa ................ G06F 3/0683 711/154 |
| 2013/0179722 | A1* | 7/2013 | Smith ................ G06F 13/4027 714/4.5 |
| 2014/0059265 | A1* | 2/2014 | Iyer ...................... G06F 9/5011 710/313 |
| 2014/0337540 | A1* | 11/2014 | Johnson ................ G06F 13/385 710/5 |
| 2015/0020064 | A1 | 1/2015 | Garza et al. |
| 2015/0026385 | A1 | 1/2015 | Egi et al. |
| 2015/0160984 | A1* | 6/2015 | Inagaki ................ G06F 15/17 710/266 |
| 2015/0261709 | A1* | 9/2015 | Billi ...................... G06F 13/404 710/316 |
| 2016/0140074 | A1* | 5/2016 | Lee ...................... G06F 13/4221 710/313 |
| 2017/0046295 | A1* | 2/2017 | Schwemmer ....... G06F 13/4022 |

FOREIGN PATENT DOCUMENTS

| | | |
|---|---|---|
| TW | I348843 | 9/2011 |
| WO | 2009120798 | 10/2009 |

OTHER PUBLICATIONS

"Office Action of Europe Counterpart Application", dated Jul. 20, 2016, p. 1-p. 7.
"Office Action of Taiwan Counterpart Application", dated Mar. 17, 2017, p. 1-p. 6.
Gillett et al., "Memory Channel Network for PCI," IEEE Micro, Feb. 1996, pp. 12-18.
Krishnan, "Towards an Integrated IO and Clustering Solution using PCI Express," IEEE International Conference on Cluster Computing, Sep. 2007, pp. 259-266.
Mayhew et al., "PCI Express and Advanced Switching: Evolutionary Path to Building Next Generation Interconnects," 11th Symposium on High Performance Interconnects, Aug. 2003, pp. 21-29.
Hawana et al., "PEARL: Power-aware, Dependable, and High-Performance Communication Link using PCI Express," 2010 IEEE/ACM International Conference on Green Computing and Communications & 2010 IEEE/ACM International Conference on Cyber, Physical and Social Computing, Dec. 2010, pp. 284-291.
Tu et al., "Marlin: A Memory-Based Rack Area Network," Proceedings of the tenth ACM/IEEE symposium on Architectures for networking and communications systems, Oct. 2014, pp. 125-136.
Byrne et al., "Power-Efficient Networking for Balanced System Designs: Early Experiences with PCIe," HotPower 11 Proceedings of the 4th Workshop on Power-Aware Computing and Systems, Oct. 2011, pp. 1-5.
Budruk et al., "PCI Express System Architecture," Addison-Wesley Professional, Apr. 2008, pp. 1-222.
Regula et al., "Using Non-transparent Bridging in PCI Express Systems," PLX Technology, Inc, Jun. 2004, pp. 1-31.
Sullivan et al., "Intel Xeon Processor C5500/C3500 Series Non-Transparent Bridge," Technology@ Intel Magazine, Jan. 2010, pp. 1-28.
Hackney, "PCI Express® System Interconnect Software Architecture for PowerQUICCTM III-based Systems," Integrated Device Technology, Inc., Dec. 2007, pp. 1-23.
Gillett et al., "Using the Memory Channel Network," IEEE Micro, Jan. 1997, pp. 19-25.
STMicroelectronics, "RM0078 Reference manual, SPEAr1340 architecture and functionality," http://www.st.com/st-web-ui/static/active/en/resource/ technical/document/reference manual/DM00024168.pdf., Nov. 2012, pp. 1-590.
Zhang et al., "Enable PCI Express Advanced Error Reporting in the Kernel," Proceedings of the Linux Symposium, Jun. 2007, pp. 297-304.
Tu et al., "Secure I/O Device Sharing among Virtual Machines on Multiple Hosts," ACM ISCA'13 Tel-Aviv, Jun. 2013, pp. 1-24.
Hiremane, "Intel Virtualization Technology for Directed I/O (Intel VT-d)," Oct. 2014, pp. 1-272.
Ben-Yehuda et al., "Utilizing IOMMUs for Virtualization in Linux and Xen," Proceedings of the Linux Symposium, 2006, pp. 1-15.
Willmann et al., "Protection Strategies for Direct Access to Virtualized I/O Devices," USENIX '08: 2008 USENIX Annual Technical Conference, Jun. 2008, pp. 15-28.
Swift et al., "Recovering Device Drivers," ACM Transactions on Computer Systems (TOCS), Nov. 2006, pp. 333-360.
Sweetman et al., "The Case for PCIe® 3.0 Repeaters," PCI-SIG Developers Conference, Mar. 2011, pp. 1-29.

* cited by examiner

PCIE NETWORK SYSTEM WITH FAIL-OVER CAPABILITY AND OPERATION METHOD THEREOF

CROSS-REFERENCE TO RELATED APPLICATION

This application claims the priority benefit of Taiwan application serial no. 104139259, filed on Nov. 25, 2015. The entirety of the above-mentioned patent application is hereby incorporated by reference herein and made a part of this specification.

BACKGROUND

Technical Field

The disclosure relates to a Peripheral Component Interconnect Express (referred to as PCIe hereinafter) device and also relates to a PCIe network system with fail-over capability and an operation method thereof.

Description of Related Art

Peripheral Component Interconnect Express (PCIe) is the industry standard computer expansion technology developed by the PCI Special Interest Group (PCI-SIG). PCIe was initially designed as a local bus interconnect technology for connecting the CPU, GPU, and I/O devices in a machine, and then developed to become a completely mature switched network featuring point-to-point links, hop-by-hop flow control, end-to-end retransmission, and so on. PCIe may also be used as the passive backplane interconnect among boards and an expansion interface for connecting the machine and an external apparatus (e.g. storage box).

A PCIe network is a switched network with serial point-to-point full duplex lanes. A PCIe device is connected to the PCIe network through a link formed by one or more lanes. Recently, expanded PCIe which uses a PCIe interface to interconnect multiple servers or virtualized I/O devices has become an interesting possibility. For example, application of PCIe may be further expanded to intra-rack interconnect. A PCIe switch may replace a standard top of rack (TOR) Ethernet switch. That is, PCIe may connect multiple hosts (e.g. servers) in one rack. The I/O devices that are allowed to be connected to the PCIe switch may be shared by all the servers in the same rack. All the servers in the rack may also communicate with each other through PCIe links.

Extension of PCIe to the multi-server environment also brings new challenges. A main limitation to the traditional PCIe architecture is that, at any time point, each PCIe domain has only one active root complex. As a result, it is not allowed to have two servers coexisting in the same PCIe domain. In order that PCIe can become a feasible system for communication and interconnection between the hosts in the rack, an additional fail-over mechanism is needed, so as to ensure that the network operation can continue when any control plane or data plane fails.

SUMMARY

The disclosure provides a Peripheral Component Interconnect Express (referred to as PCIe hereinafter) network system having fail-over capability in a PCIe network environment and an operation method thereof.

An exemplary embodiment of the disclosure provides a PCIe network system, which includes a first management host, a PCIe switch, a first non-transparent bridge, and a second non-transparent bridge. A first upstream port of the PCIe switch is electrically coupled to the first management host. The first non-transparent bridge is disposed in the PCIe switch for electrically coupling to a first PCIe port of a first calculation host. The first non-transparent bridge may couple the first PCIe port of the first calculation host to the first management host. The second non-transparent bridge is disposed in the PCIe switch for electrically coupling to a second PCIe port of the first calculation host. The second non-transparent bridge may couple the second PCIe port of the first calculation host to the first management host.

An exemplary embodiment of the disclosure provides an operation method of a PCIe network system, which includes: disposing a first management host; disposing a PCIe switch, wherein a first upstream port of the PCIe switch is electrically coupled to the first management host; disposing a first non-transparent bridge in the PCIe switch for electrically coupling to a first PCIe port of a first calculation host; disposing a second non-transparent bridge in the PCIe switch for electrically coupling to a second PCIe port of the first calculation host; coupling the first PCIe port of the first calculation host to the first management host by the first non-transparent bridge; and coupling the second PCIe port of the first calculation host to the first management host by the second non-transparent bridge.

An exemplary embodiment of the disclosure provides a PCIe network system, which includes a PCIe switch, a first management host, a second management host, and a first non-transparent bridge. The first management host is electrically coupled to a first upstream port of the PCIe switch. The second management host is electrically coupled to a second upstream port of the PCIe switch. The first non-transparent bridge is disposed in the PCIe switch for electrically coupling to a PCIe port of a first calculation host. When the first management host manages the PCIe switch, the first non-transparent bridge may couple the PCIe port of the first calculation host to the first management host. When the second management host detects a failure of the first management host, the second management host performs a fail-over procedure to manage the PCIe switch in place of the first management host, such that the first non-transparent bridge changes to couple the PCIe port of the first calculation host to the second management host.

An exemplary embodiment of the disclosure provides an operation method of a PCIe network system, which includes: disposing a PCIe switch; disposing a first management host electrically coupled to a first upstream port of the PCIe switch; disposing a second management host electrically coupled to a second upstream port of the PCIe switch; and disposing a first non-transparent bridge in the PCIe switch for electrically coupling to a PCIe port of a first calculation host; when the first management host manages the PCIe switch, coupling the PCIe port of the first calculation host to the first management host by the first non-transparent bridge; and when the second management host detects a failure of the first management host, performing a fail-over procedure by the second management host for the second management host to manage the PCIe switch in place of the first management host, such that the first non-transparent bridge changes to couple the PCIe port of the first calculation host to the second management host.

Based on the above, the PCIe network system and the operation method according to the exemplary embodiments of the disclosure provide a fault-tolerant PCIe-based area network architecture combined with a fail-over mechanism. The PCIe network system and the operation method take the PCIe architecture and significantly reduce the service disruption time caused by failure of the PCIe root complex or PCIe link/switch.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
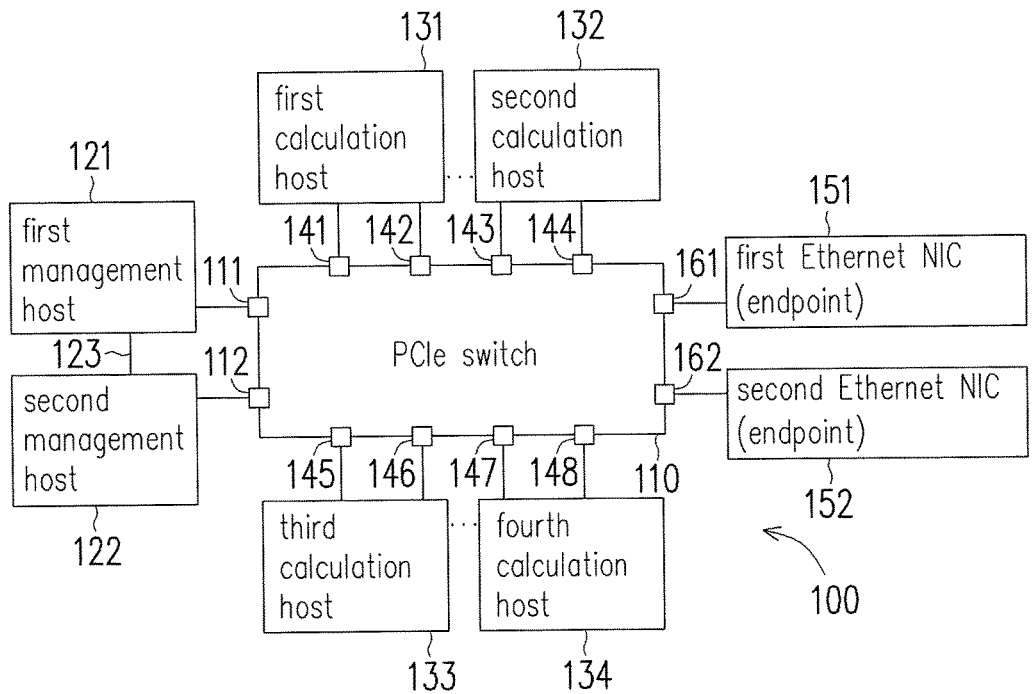
FIG. 1 is a circuit block diagram illustrating a PCIe network system according to an exemplary embodiment of the disclosure.

The term "couple (or connect)" used throughout this specification (including the claims) may refer to any direct or indirect connection means. For example, if it is described that the first device is coupled (or connected) to the second device, it should be understood that the first device may be directly connected to the second device or indirectly connected to the second device through other devices or certain connection means. Moreover, elements/components/steps with the same reference numerals represent the same or similar parts in the drawings and embodiments where appropriate. Descriptions of elements/components/steps with the same reference numerals or terms in different embodiments may be reference for one another.

The Peripheral Component Interconnect (PCI) standard allows a bus to function as a bridge, which isolates a local processor bus from the peripheral component to allow the central processing unit (CPU) of the computer to run faster. A successor to PCI is called PCI Express (i.e. PCIe). PCIe achieves higher performance and maintains the compatibility with the existing PCI application software. Compared with PCI, a PCIe protocol that has three layers (i.e. a transaction layer, a data link layer, and a physical layer) is even more complicated. In the transaction layer, PCIe implements split transactions by requests and responses that are separated by time. The data link layer sorts transaction layer packets (TLP) generated by the transaction layer, so as to ensure that the TLP can be reliably delivered between two endpoints through an acknowledgment protocol and request to replay unacknowledged/bad TLP, and initializes and manages flow control credits. The physical layer is divided into two sub-layers corresponding to the electrical specification and the logic specification.

In a PCIe system, a root complex device connects a processor and a memory sub-system to PCIe switch fabrics that include one or more switch devices. PCIe uses a point-to-point architecture. It is similar to a host bridge in a PCI system. The root complex device (management host) generates a transaction request, such as a processor behavior. The function of the root complex device may be implemented as a discrete device or may be integrated with the processor.

In the following exemplary embodiments, a fault-tolerant PCIe-based rack area network architecture combined with a fail-over mechanism is provided. The following exemplary embodiments take the PCIe architecture and significantly reduce the service disruption time caused by failure of the PCIe root complex or PCIe link/switch. An empirical test of operating the prototype shows that a PCIe root complex failure causes no influence to the data plane and incurs a small service disruption time to the control plane. For a redundant PCIe data path, the service disruption time caused by a PCIe link/switch failure mainly results from delay related to failure detection of the target endpoint and address re-mapping.

The following exemplary embodiments cleverly utilize a non-transparent bridge (NTB). The NTB is designed as an isolated PCIe domain but provides memory address translation, so as to access the resources in one PCIe domain from another PCIe domain. The NTB is a standard PCIe device, and details thereof are not repeated hereinafter.

FIG. 1 is a circuit block diagram illustrating a PCIe network system 100 according to an exemplary embodiment of the disclosure. The PCIe network system 100 includes a PCIe switch 110, a first management host 121, a second management host 122, a first calculation host 131, a second calculation host 132, a third calculation host 133, a fourth calculation host 134, a first non-transparent bridge (NTB) 141, a second NTB 142, a third NTB 143, a fourth NTB 144, a fifth NTB 145, a sixth NTB 146, a seventh NTB 147, and an eighth NTB 148. The number of the management hosts, the number of the calculation hosts, and the number of the NTBs may be determined according to the design requirements and are not limited to the numbers shown in FIG. 1. According to application requirements, the PCIe network system 100 may be applied to a server rack or other environments. A component of a PCIe-based multi-host rack area networking architecture is a top of rack (TOR) switch. Each machine or calculation host (e.g. server) in the rack is connected to two ports of the PCIe switch through two independent PCIe expansion cards and two PCIe cables, and communicates with other calculation hosts in the rack by PCIe and communicates with machines outside the rack through Ethernet ports (e.g. a first Ethernet network interface card (NIC) 151 and a second Ethernet NIC 152) of the TOR switch (PCIe switch).

A first upstream port 111 of the PCIe switch 110 is electrically coupled to the first management host 121. A second upstream port 112 of the PCIe switch 110 is electrically coupled to the second management host 122. The PCIe network system 100 is provided with two management hosts, which are the first management host 121 and the second management host 122, one serving as a master management host (MMH) while the other serving as a backup management host (BMH). The roles of master management host and backup management host are not fixed for the first management host 121 and the second management host 122. For example, in an initial state, the first management host 121 may serve as a root complex of a PCIe domain of the PCIe switch 110, i.e. the role of the master management host, while the second management host 122 serves as the backup management host. When the first management host 121 fails, the second management host 122 may perform a "fail-over procedure" (will be described in detail later) to manage the PCIe switch 110 in place of the first management host 121. After the "fail-over procedure" is completed, the role of the second management host 122 changes from the backup management host to the master management host, and the role of the first management host 121 changes from the master management host to the backup management host. The first management host 121 and the second management host 122 are connected with each other by a point-to-point Ethernet link 123. The point-to-point Ethernet link 123 may be loaded with memory state synchronization and heartbeats.

The first to eighth NTBs 141-148 are respectively disposed in the PCIe switch 110. The first NTB 141 may be electrically coupled to a first PCIe port of the first calculation host 131. The second NTB 142 may be electrically coupled to a second PCIe port of the first calculation host 131. The third NTB 143 may be electrically coupled to a first PCIe port of the second calculation host 132. The fourth NTB 144 may be electrically coupled to a second PCIe port of the second calculation host 132. The fifth NTB 145 may be electrically coupled to a first PCIe port of the third calculation host 133. The sixth NTB 146 may be electrically coupled to a second PCIe port of the third calculation host 133. The seventh NTB 147 may be electrically coupled to a first PCIe port of the fourth calculation host 134. The eighth NTB 148 may be electrically coupled to a second PCIe port of the fourth calculation host 134. The first NTB 141 may couple the first PCIe port of the first calculation host 131 to the first management host 121 or the second management host 122. The second NTB 142 may couple the second PCIe port of the first calculation host 131 to the first management host 121 or the second management host 122. The third to eighth NTBs 143-148 are respectively coupled in the same manner according to the above description of the first and second NTBs 141-142.

Figure 2:
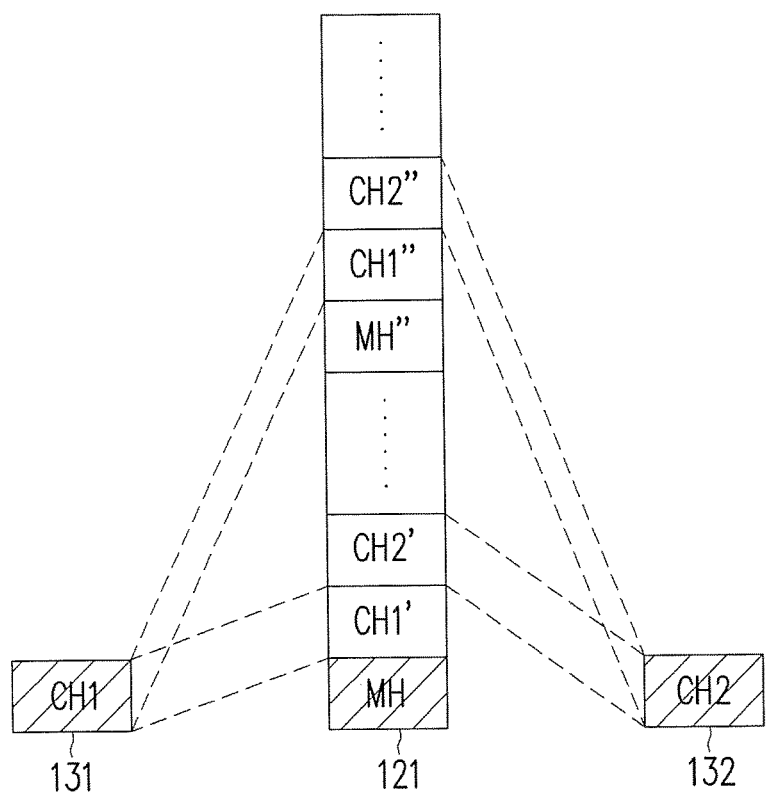
FIG. 2 and FIG. 3 are schematic diagrams illustrating memory address spaces of the management host, calculation host, and calculation host shown in FIG. 1 according to an exemplary embodiment of the disclosure.
Figure 3:
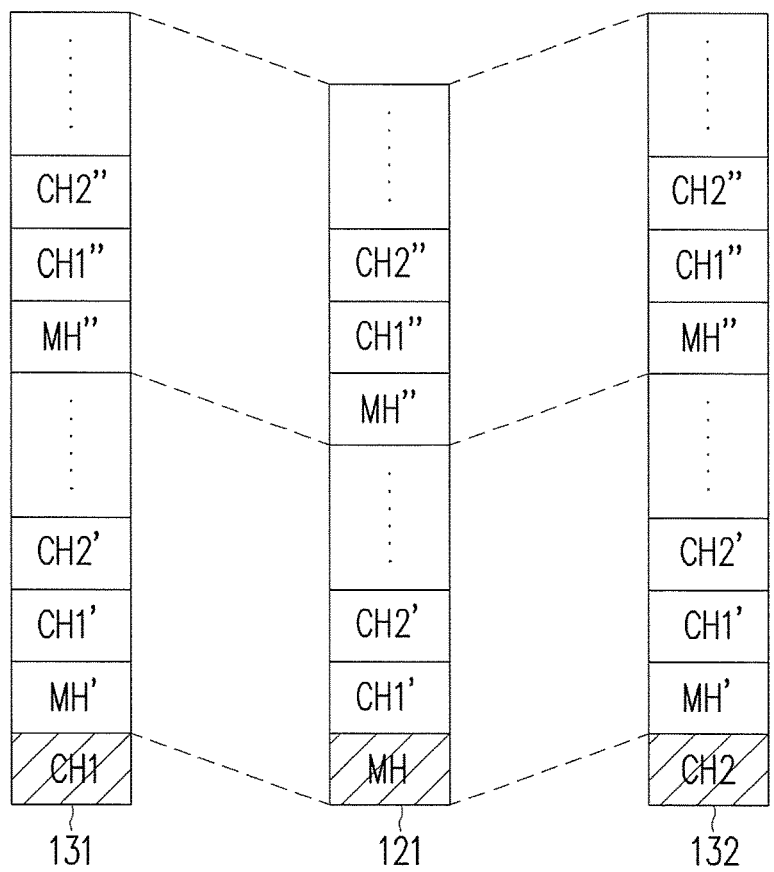

FIG. 2 and FIG. 3 are schematic diagrams illustrating memory address spaces of the first management host 121, the first calculation host 131, and the second calculation host 132 shown in FIG. 1 according to an exemplary embodiment of the disclosure. Here it is assumed that the first management host 121 serves as the root complex of the PCIe domain of the PCIe switch 110, i.e. the master management host. A global memory address space of the first management host 121 is defined as a plurality of address ranges, as shown in FIG. 2. One of the address ranges is allocated to serve as a local memory address MH of the first management host 121 (as indicated by the hatched area in FIG. 2). The first management host 121 of the PCIe switch 110 maps a primary memory of each connected machine (e.g. the first to fourth calculation hosts 131-134 as shown in FIG. 1) to the global memory address space (physical memory address space) of the first management host 121. As shown in FIG. 2, a local primary memory address CH1 of the first calculation host 131 and a local primary memory address CH2 of the second calculation host 132 are respectively mapped to extended memory addresses CH1' and CH2' of the global memory address space of the first management host 121. Moreover, the local primary memory address CH1 of the first calculation host 131 and the local primary memory address CH2 of the second calculation host 132 are additionally mapped to extended memory addresses CH1" and CH2" of the global memory address space of the first management host 121.

For example, it is assumed that each machine (including the management host) connected to the PCIe switch 110 has a local memory of 32 GB (but not limited thereto). The first management host 121 maps the local memory of the $i^{th}$ connected machine to the range of 32 GB+(i−1)*32 GB to 32 GB+i*32 GB of the global memory address space of the first management host 121 and additionally maps the local memory of the $i^{th}$ connected machine to the range of 1 TB+32 GB+(i−1)*32 GB to 1 TB+32 GB+i*32 GB of the global memory address space of the first management host 121.

The first management host 121 discloses the global memory address space thereof to each machine connected to the PCIe switch 110. A global memory address space of the first calculation host 131 is defined as a plurality of address ranges and a global memory address space of the second calculation host 132 is also defined as a plurality of address ranges, as shown in FIG. 3. One of the address ranges of the first calculation host 131 is allocated to serve as the local memory address CH1 of the first calculation host 131 (as indicated by the hatched area in FIG. 3). One of the address ranges of the second calculation host 132 is allocated to serve as the local memory address CH2 of the second calculation host 132 (as indicated by the hatched area in FIG. 3). Then, each machine (e.g. the first calculation host 131 and the second calculation host 132) connected to the PCIe switch 110 maps the entire physical address space (global memory address space) of the first management host 121 to the range of the respective extended memory address space, as shown in FIG. 3.

The extended memory address CH1' of the first management host 121 may be mapped to the local memory address CH1 of the first calculation host 131 through the first NTB 141 of the PCIe switch 110. The first management host 121 may access the resources at the local memory address CH1 of the first calculation host 131 through the first NTB 141 of the PCIe switch 110 by using the extended memory address CHF (address range). The extended memory address CH1" of the first management host 121 may be mapped to the same local memory address CH1 of the first calculation host 131 through the second NTB 142 of the PCIe switch 110. The first management host 121 may access the resources at the local memory address CH1 of the first calculation host 131 through the second NTB 142 of the PCIe switch 110 by using the extended memory address CH1" (address range). The above description may apply to the access operation that the first management host 121 performs on the other calculation hosts (e.g. the second calculation host 132). Thus, details thereof are not repeated hereinafter. The first management host 121 maps the local physical address space of each connected machine to two independent regions in the global address space, so as to provide two independent paths to reach/access the resources of each connected machine.

An extended memory address MH' of the first calculation host 131 is mapped to the local memory address MH of the first management host 121 through the first NTB 141 of the PCIe switch 110. The first calculation host 131 may access the resources at the local memory address MH of the first management host 121 through the first NTB 141 of the PCIe switch 110 by using the extended memory address MH' (address range) of the physical address space thereof. An extended memory address MH" of the first calculation host 131 is mapped to the same local memory address MH of the first management host 121 through the second NTB 142 of the PCIe switch 110. Therefore, the first calculation host 131 may also access the resources of the local memory address MH of the first management host 121 through the second NTB 142 of the PCIe switch 110 by using the extended memory address MH" (address range) of the physical address space thereof. The above description regarding the first calculation host 131 may apply to the access operations that the other calculation hosts (e.g. the second calculation host 132) perform on the first management host 121. Thus, details thereof are not repeated hereinafter.

For example, it is assumed that each machine (including the management host) connected to the PCIe switch 110 has a local memory of 32 GB (but not limited thereto). The calculation host (e.g. the first calculation host 131) connected to the PCIe switch 110 may access the local memory of the $i^{th}$ connected machine (e.g. the second calculation host 132) by reading or writing the local physical memory address range of 64 GB+(i−1)*32 GB to 64 GB+i*32 GB. In other words, one machine connected to the PCIe switch 110 may assess the local memory thereof through the range lower than 32 GB (directly), or access the local memory thereof through the range higher than 64 GB (indirectly through the physical address space of the first management host 121). It is assumed that there are fifty machines connected to the PCIe switch 110, including the first management host 121. Then, the physical memory of 1600 GB that can be seen in each connected machine (e.g. the first calculation host 131) includes the local memory of 32 GB belonging to the machine itself (zero hop), the memory of 32 GB belonging to the first management host 121 (one hop), and the memory of 1536 GB belonging to the other connected machines (e.g. the second calculation host 132) (two hops). Therefore, the PCIe switch 110 may transfer the physical memories of all the connected machines to a global memory pool.

For example, the extended memory address CH2' of the first calculation host 131 is mapped to the extended memory address CH2' of the first management host 121 through the first NTB 141 of the PCIe switch 110, and the extended memory address CH2' of the first management host 121 is mapped to the local memory address CH2 of the second calculation host 132 through the third NTB 143 of the PCIe switch 110. The first calculation host 131 may access the resources at the local memory address CH2 of the second calculation host 132 through the first NTB 141 of the PCIe switch 110 and the first management host 121 by using the extended memory address CH2' (address range). In addition, the extended memory address CH2" of the first calculation host 131 may be mapped to the extended memory address CH2" of the first management host 121 through the second NTB 142 of the PCIe switch 110, and the extended memory address CH2" of the first management host 121 is mapped to the same local memory address CH2 of the second calculation host 132 through the fourth NTB 144 of the PCIe switch 110. Therefore, the first calculation host 131 may access the resources at the local memory address CH2 of the second calculation host 132 through the second NTB 142 of the PCIe switch 110 and the first management host 121 by using the extended memory address CH2" (address range).

System Initialization:

When the PCIe switch 110 is started, the management host thereof (e.g. the first management host 121) may enumerate all the related devices connected to the PCIe switch 110, including Ethernet network interface cards (Ethernet NICs, e.g. the first Ethernet NIC 151 and the second Ethernet NIC 152) and NTBs (e.g. the first to eighth NTBs 141-148). The first Ethernet NIC 151 is connected to a PCIe port 161 of the PCIe switch 110 through a PCIe cable and the second Ethernet NIC 152 is connected to a PCIe port 162 of the PCIe switch 110 through a PCIe cable. Then, the aforementioned memory address mapping (see description of FIG. 2 and FIG. 3) is set to a base address register (BAR), a memory translation register, and a device ID translation table on the NTBs (e.g. the first to eighth NTBs 141-148) of the PCIe switch 110 by programming. Thereafter, the first management host 121 may also expose the physical memory address ranges of the Ethernet NICs (e.g. the first Ethernet NIC 151 and the second Ethernet NIC 152) to all the connected machines for them to directly interact with these NICs. In order that the machines connected to the PCIe switch 110 can access the NICs (e.g. the first Ethernet NIC 151 and the second Ethernet NIC 152) without affecting each other, the first management host 121 may allocate one or more virtual functions (VF) from the first Ethernet NIC 151 and the second Ethernet NIC 152 having single-root IO virtualization (SRIOV) capability to each machine. The virtual function allocating mechanism requires a special PCIe driver to be installed in the connected machine. In order to tolerate the failure of any single NIC, one connected machine may request multiple virtual functions from different Ethernet NICs (e.g. the first Ethernet NIC 151 and the second Ethernet NIC 152).

Since each machine connected to the PCIe switch 110 may be addressed to each physical memory page of each machine of the same switch, data security and safety becomes a concern. More specifically, the PCIe switch 110 needs to ensure that the machine connected to the PCIe switch 110 can access the remote physical memory page in the global memory pool when it is specifically allowed. The PCIe switch 110 uses an input-output memory management unit (IOMMU) to provide such safety protection. When the PCIe device on one machine accesses the physical memory of this machine, the IOMMU uses an IOMMU mapping table to transfer the address specified by the access operation to the physical memory address space of the machine. When the target address of one PCIe operation does not match any entry in the IOMMU mapping table, the PCIe operation is rejected and discontinued. The conventional IOMMU is for preventing one virtual function in one machine from damaging another virtual function of the same machine. In this exemplary embodiment, the IOMMU is utilized again in the PCIe switch 110 to prevent one physical machine (e.g. the first calculation host 131) from accessing the primary memory of another physical machine (e.g. the second calculation host 132) without permission of the another physical machine (e.g. the second calculation host 132).

The PCIe switch 110 requests the management host (e.g. the first management host 131) to serve as the first starting machine. After the first management host 121 enumerates all the devices, the rest of the calculation hosts may be started. The fail-over mechanism of the PCIe switch 110 is implemented as a registered callback function of the drivers of the NTBs and the drivers of the SRIOV Ethernet NICs. When an error is received, a PCIe advanced error reporting (AER) driver first identifies the error reporting device and calls the corresponding registered callback function of the driver of the corresponding device.

Failure Detection:

In order to detect and respond to the failure of the PCIe link/switch, the PCIe switch 110 uses the PCIe AER mechanism of each calculation host and management host. Because the PCIe network system 100 includes a plurality of PCIe domains, in each PCIe domain, the PCIe network system 100 enables a PCIe AER service driver to quickly detect any failure in the PCIe domain. For each calculation host and management host, when receiving an error message, the root complex thereof generates a disruption including an error reporting device ID, and this error information is recorded in the corresponding AER extended capacity structure. Through the AER, as shown in FIG. 2 and FIG. 3, each calculation host may monitor two associated NTBs thereof, and the management host may monitor all PCIe endpoints in the primary PCIe domain, including all PCIe ports, switches, and Ethernet NICs.

Whenever the AER driver detects an error, it reports the detected error to the management host (e.g. the first management host 121) and the management host collects all error reports from all the calculation hosts (e.g. the first to fourth calculation hosts 131-134) and notifies the affected calculation hosts to take an appropriate failure recovery action, such as switching routes, when necessary. As long as each calculation host includes at least one functioning PCIe extender and NTB port, the calculation host is considered as a reachable/accessible management host. Therefore, for any single failure, the management host (e.g. the first management host 121) is able to collect the error reports from the calculation hosts and request no separate out-of-band communication for failure recovery.

Primary/Secondary Address Space:

Because one calculation host (e.g. the first calculation host 131) is connected to the PCIe switch 110 through a primary NTB (e.g. the first NTB 141) and a secondary NTB (e.g. the second NTB 142), the PCIe network system 100 maps the local physical memory space of each calculation host to two different memory address ranges in the global memory space owned by the management host, as shown in FIG. 2 and FIG. 3. It is assumed that the rack includes 32 servers (calculation hosts) in total, and each server consumes 32 GB of the local memory address space for the primary memory and a MMIO (memory-mapped input output) device thereof. By mapping the primary memory of each connected machine to the physical memory address space used by the secondary NTB again, the PCIe network system 100 puts the secondary address range higher than 1 TB (which is merely an example, and the disclosure is not limited thereto) and discloses the secondary physical memory address space thereof to each connected machine, as shown in FIG. 3. Therefore, the first management host 121 maps the local memory of the $i^{th}$ connected machine to two different physical address ranges in the global memory pool to form the address range of 32 GB+(i−1)*32 GB to 32 GB+i*32 GB of the primary NTB device and another address range of 1 T+32 GB+(i−1)*32 GB to 1 T+32 GB+i*32 GB of the secondary NTB device. Then, each connected machine (e.g. calculation host) maps 0 to 1 TB of the primary physical address space of the management host (used by the primary NTB) and 1 to 2 TB of the secondary physical address space of the management host (used by the secondary NTB) to the range of 32 GB or more of the local physical address space thereof.

With this configuration, one connected machine (e.g. the first calculation host 131) may use two independent paths (one through the primary first NTB 141 and the other through the secondary second NTB 142) to access the local memory of another connected machine (e.g. the second calculation host 132). For example, it is assumed that each machine (including the management host) connected to the PCIe switch 110 has a local memory of 32 GB (but not limited thereto). A memory request of reading or writing the range of 96 GB to 128 GB (i.e. the extended memory address CH2') of the local physical memory address from the first calculation host 131 may reach the local memory address CH2 of the second calculation host 132 through the primary first NTB 141 and the connection line thereof. A memory request of reading or writing the range of 1 T+96 GB to 1 T+128 GB (i.e. the extended memory address CH2″) of the local physical memory address range from the first calculation host 131 may reach the local memory address CH2 of the second calculation host 132 through the secondary second NTB 142 and the connection line thereof. The modern 64-bit server (calculation host) at least supports a 48 bit or 256 TB physical address. It is assumed that each server has a physical memory of 64 GB, and the 256 TB physical address space may support up to 2048 servers (each server consumes two NTBs).

Data Plane Fault Tolerance:

Each calculation host occupies two physical address ranges in the global storage space managed by the management host, and the strategy of use of the two physical address ranges may be two different designs as follows, i.e. active-passive design and active-active design.

Active-passive design: Even though each calculation host occupies two physical address ranges in the global storage space managed by the management host, at any time point, only one of the two physical address ranges is active, and therefore one of two NTBs is used. In this configuration, whenever one PCIe AER driver in the calculation host or management host is called, it first checks whether the reported error is uncorrectable and fatal. If the reported error is indeed uncorrectable and fatal, the fail-over procedure is triggered. The fail-over procedure includes the following: 1. reporting the uncorrectable and fatal error to the management host; 2. notifying all the calculation hosts of the failure of the related primary address space by using a doorbell and a scratchpad mechanism associated with the corresponding NTB, such that the calculation hosts may be switched to the secondary address space; and 3. modifying IOMMU of the management host, such that a defect management area (DMA) operation initiated in PCIe domain of the management host may be switched to the secondary address space. Each calculation host maintains a list of physical memory addresses and uses it to access the resources of the remote calculation host, including the primary memory or MMIO device. When the management host sends a PCIe fail-over notification, each calculation host consults the list to modify them in order to use the counterparts in the secondary address space. For example, when the PCIe fail-over notification is received, the second calculation host 132 changes addresses for accessing the first calculation host 131 from 64 G to 96 G (the extended memory address CH1') to 1 T+64 G to 1 T+96 GB (the extended memory address CH″) (this is merely an example, and the disclosure is not limited thereto). The accessing to the 1 T+64 G memory in the second calculation host 132 is converted to an accessing to the 1 T+32 G memory (the extended memory address CH1″) in the first management host 121, and BAR of the secondary NTB of the first calculation host 131 in the management host domain is used. Likewise, the management host maintains a similar list of physical memory addresses (used for the target of the DMA operation initiated by the I/O device residing in the PCIe domain of the management host). When the fail-over is performed, the management host consults the list to modify the related entries in the IOMMU to be used in the counterparts in the secondary address space. The active-passive design has simplicity: only one global variable requires system state maintenance. In this design, however, many links are not utilized sufficiently. Moreover, the failure of any single NTB/link in one calculation host may cause all the calculation hosts to switch their NTBs/links even if their NTBs/links function properly.

Active-active design: the active-active design of data plane fault tolerance allows simultaneous use of the primary and secondary address spaces of the calculation host. Each calculation host maintains a list of remote physical memory addresses (which stores resources of other calculation hosts) and the management host maintains a list of DMA physical memory addresses (the I/O device thereof is used for the DMA operation). A PCIe error will trigger PCIe fail-over at any time, and each calculation host consults the list of remote physical memory addresses and only modifies the parts affected by the fail-over; and the management host consults the list of DMA physical memory addresses and only modifies the parts that are affected by the fail-over in the IOMMU. In this design, the range of the PCIe fail-over may be a part of the primary address space, instead of the entire primary address space. Therefore, at any time point, some calculation hosts may be accessed only through the secondary address spaces while other calculation hosts may be accessed through the primary and secondary address spaces.

Figure 4:
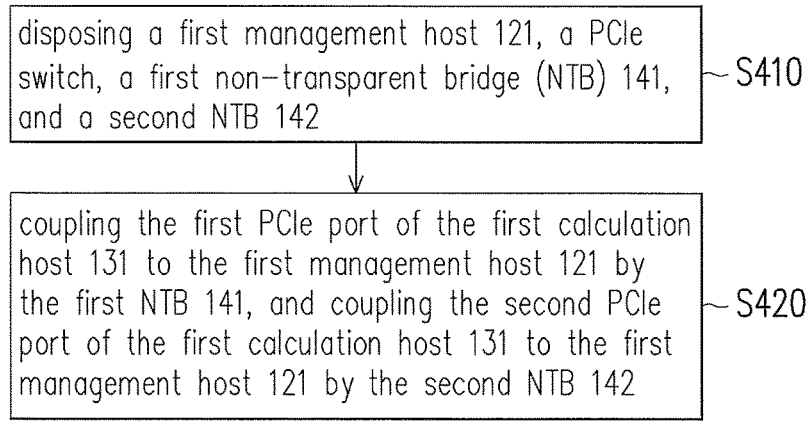
FIG. 4 is a flowchart illustrating an operation method of the PCIe network system shown in FIG. 1 according to an exemplary embodiment of the disclosure.

Based on the above, FIG. 4 is a flowchart illustrating an operation method of the PCIe network system 100 shown in FIG. 1 according to an exemplary embodiment of the disclosure. In Step S410, a first management host 121 and a PCIe switch 110 are disposed, wherein a first upstream port 111 of the PCIe switch 110 is electrically coupled to the first management host 121. In Step S410, a first NTB 141 and a second NTB 142 are further disposed in the PCIe switch 110. The first NTB 141 may be electrically coupled to a first PCIe port of a first calculation host 131 and the second NTB 142 may be electrically coupled to a second PCIe port of the first calculation host 131. In Step S420, the first NTB 141 may couple the first PCIe port of the first calculation host 131 to the first management host 121 and the second NTB 142 may couple the second PCIe port of the first calculation host 131 to the first management host 121.

Control Plane Fault Tolerance:

The first management host 121 and the second management host 122 of the PCIe switch 110 may respond to the mapping of the physical memory and physical address space of the connected machine and exposes the physical address space thereof, including the address range associated with the PCIe devices thereof (e.g. network interface card), to the connected machine in a safe way. After address allocation of each PCIe device, the management host allocates a routing table of each P2P bridge in the PCIe hierarchy, so that the PCIe packet may be forwarded accordingly. Once the management host completes this configuration, its function becomes visible (change in the PCIe device tree thereof, i.e. addition or deletion of PCIe endpoints). The management host is not involved in the peer-to-peer data transmission between the PCIe endpoints. In fact, if the management host fails, the PCIe endpoints may continue exchanging data with each other as long as the routing state in the P2P bridge is maintained. Therefore, when the management host fails, it is not required to immediately recover from such failure, particularly because the conventional recovery procedure for failure of the management host will require system-wide restart for all PCIe endpoints. The following exemplary embodiment of the disclosure describes a seamless management host fail-over for reducing disruption of the control plane.

Figure 5:
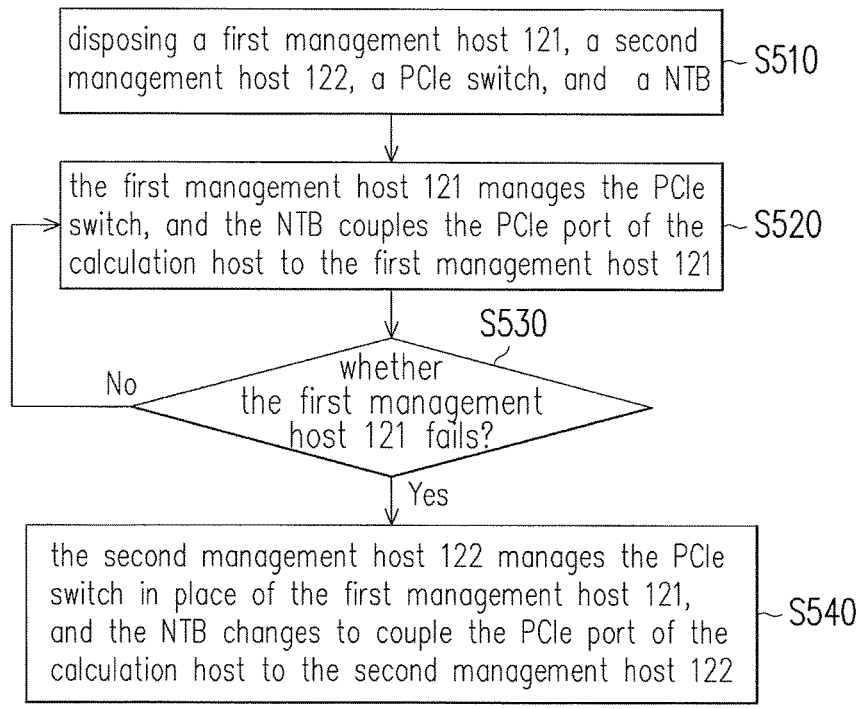
FIG. 5 is a flowchart illustrating an operation method of the PCIe network system shown in FIG. 1 according to another exemplary embodiment of the disclosure.

FIG. 5 is a flowchart illustrating an operation method of the PCIe network system 100 shown in FIG. 1 according to another exemplary embodiment of the disclosure. In Step S510, a PCIe switch 110, a first management host 121, and a second management host 122 are disposed. The first management host 121 is electrically coupled to a first upstream port 111 of the PCIe switch 110 and the second management host 122 is electrically coupled to a second upstream port 112 of the PCIe switch 110. In Step S510, a first NTB 141 is further disposed in the PCIe switch 110. The first NTB 141 may be electrically coupled to a PCIe port of a first calculation host 131. In Step S520, the first management host 121 manages the PCIe switch 110, and the first NTB 141 couples the PCIe port of the first calculation host 131 to the first management host 121. In Step S530, the second management host 122 may detect whether the first management host 121 fails. When the second management host 122 detects that the first management host 121 fails, the second management host 122 performs a fail-over procedure to manage the PCIe switch 110 in place of the first management host 121, and the first NTB 141 changes to couple the PCIe port of the first calculation host 131 to the second management host 122 (Step S540).

In order to achieve the seamless management host fail-over, the PCIe network system 100 is provided with two management hosts, which are the first management host 121 and the second management host 122, one serving as a master management host while the other serving as a backup management host. The master management host and the backup management host may be connected by a point-to-point Ethernet network 123, which has memory state synchronization and heartbeats. In addition, the master management host synchronously copies and modifies the following state to the backup management host via a dedicated link: 1. result of the initial PCIe device scanning and enumeration, which includes allocation of physical address range, interrupt number, and so on; 2. content of BAR, content of the translation register, content of the device ID conversion table, and content of IOMMU of the NTB in the PCIe domain; 3. allocation of virtual function (VF) of the PCIe device supporting SRIOV for the connected machine; and 4. internal state of the PCIe device driver in the domain.

The PCIe switch 110 may be divided into a plurality of virtual switches, which may be used independently. For example, the PCIe network system 100 flexibly divides the PCIe switch 110 into two virtual switches, i.e. a first virtual switch VS1 and a second virtual switch VS2. The first virtual switch VS1 has the first upstream port 111, and the first management host 121 is connected to the first upstream port 111 of the first virtual switch VS1. The second virtual switch VS2 has the second upstream port 112, and the second management host 122 is connected to the second upstream port 112 of the second virtual switch VS2. In the initial state, it is assumed that the first management host 121 manages the PCIe switch 110, and all downstream ports of the PCIe switch 110 are allocated to the first virtual switch VS1 while the second virtual switch VS2 has only one port (the second upstream port 112). Thus, when the first management host 121 manages the PCIe switch 110, the first virtual switch VS1 is connected to the first management host 121 and all the other PCIe devices (e.g. the first to fourth calculation hosts 131-134). When the second management host 122 detects that the first management host 121 fails, the second management host 122 performs the fail-over procedure to manage the PCIe switch 110 in place of the first management host 121.

Figure 6:
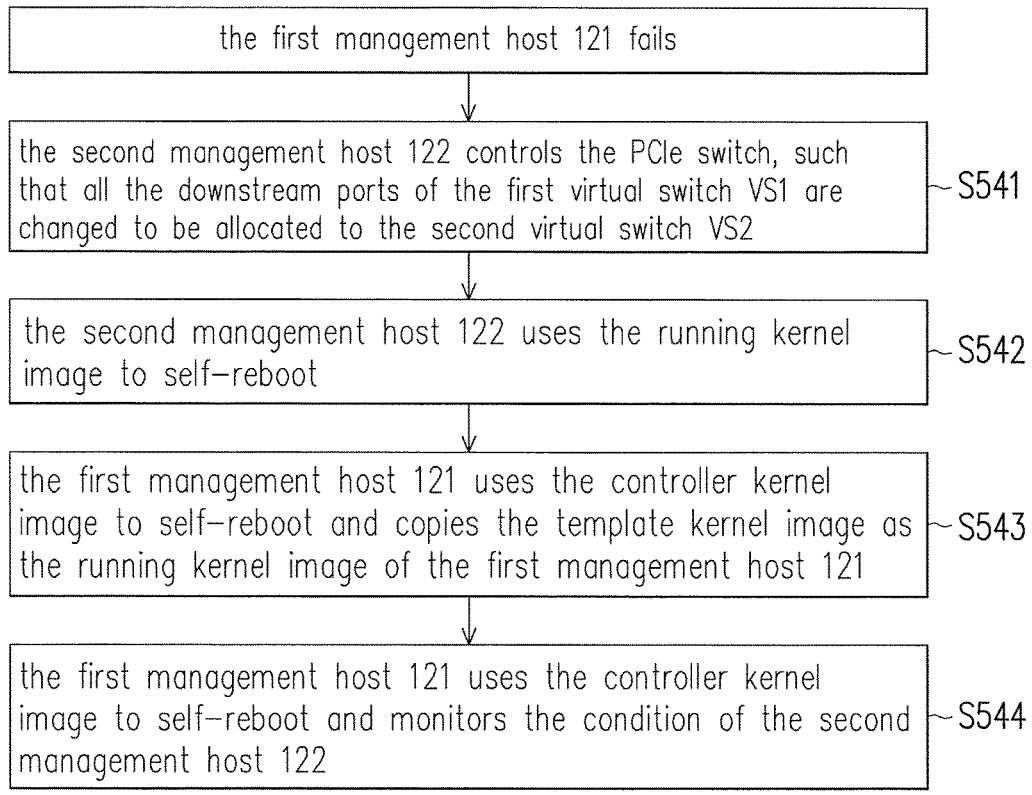
FIG. 6 is a flowchart illustrating details of Step S540 shown in FIG. 5 according to an exemplary embodiment of the disclosure.

FIG. 6 is a flowchart illustrating details of Step S540 shown in FIG. 5 according to an exemplary embodiment of the disclosure. In the exemplary embodiment shown in FIG. 6, the fail-over procedure of Step S540 includes sub-steps S541-S544. When the second management host 122 detects that the first management host 121 fails, Step S541 is executed. When the master management host fails, in Step S541, the second management host 122 controls the PCIe switch 110, such that all the downstream ports of the first virtual switch VS1 are changed to be allocated to the second virtual switch VS2 while the first virtual switch VS1 only has the first upstream port 111. Reallocating all the PCIe devices (except for the first management host 121) from the first virtual switch VS1 to the second virtual switch VS2 allows the second management host 122 to take over control over the PCIe switch 110. The reallocation allows the second virtual switch VS2 to form a new PCIe hierarchy. A critical nature of the port reallocation is that when switching from the first virtual switch VS1 to the second virtual switch VS2, the bridges' routing table states remain unchanged. In fact, only the highest-level bridge needs to update/switch the first upstream port 111 thereof (connected to the first management host 121) to another second upstream port 112 (connected to the second management host 122). The result is that the upstream port configuration is changed without affecting the peer-to-peer communication between the PCIe downstream ports.

The routing state of the PCIe bridge includes a continuous address range (covering its downstream port), and any packet with a destination address outside this range will be forwarded to the upstream port. Therefore, the change of the upstream port does not affect the peer-to-peer communication between the PCIe endpoints. Moreover, since the PCIe-related state of the second management host 122 is completely the same as the PCIe-related state of the first management host 121, when PCIe devices are added or deleted or when PCIe resources are allocated or released, the second management host 122 is able to restore service of the control plane instantly. The PCIe network system 100 uses Linux suspend/resume facility. When a suspension operation is applied, the state of the entire system (including the state of the driver) is snapshotted and saved in a disk.

Specifically, the first management host 121 and the second management host 122 both need to have three disk partitions for retaining three different kernel images, which include a controller kernel image, a template kernel image, and a running kernel image. The controller kernel is for booting up the management host so as to manage the other two kernel images. The template kernel is for retaining a golden kernel image that may be used repeatedly after occurrence of a failure. After all PCIe device drivers are initialized, the template kernel is created by executing the suspension instruction of the system. The running kernel is the kernel by which the first management host 121 and the second management host 122 execute the management host functions. At the beginning, the controller images of the first management host 121 and the second management host 122 are the same as their template images, and the running images of the first management host 121 and the second management host 122 are empty.

Figure 7:
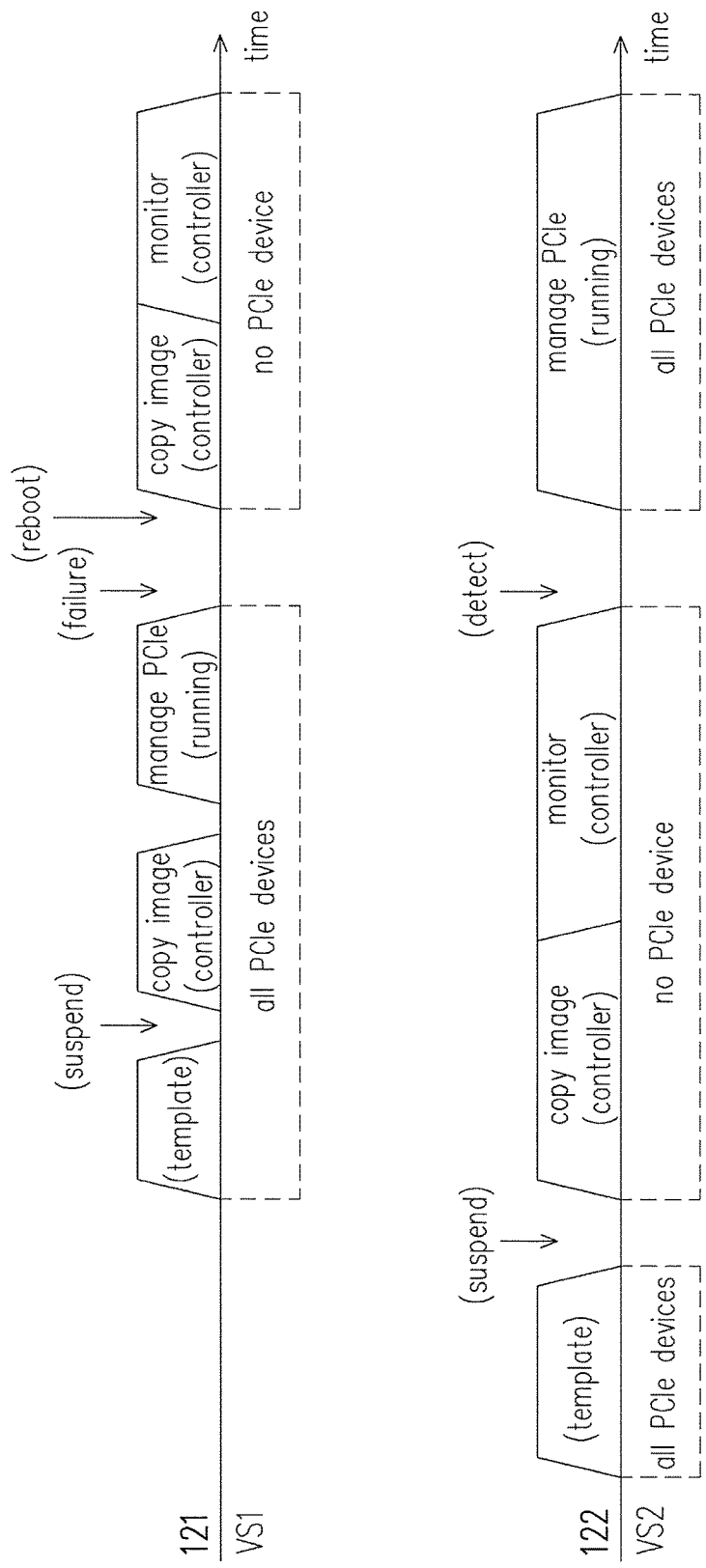
FIG. 7 is an operation timing diagram of the management host shown in FIG. 1 according to an exemplary embodiment of the disclosure.

FIG. 7 is an operation timing diagram of the first management host 121 and the second management host 122 shown in FIG. 1 according to an exemplary embodiment of the disclosure. The horizontal axis of FIG. 7 represents the time. The upper half of FIG. 7 illustrates the change of the operation state of the first management host 121 and the first virtual switch VS1 and the lower half of FIG. 7 illustrates the change of the operation state of the second management host 122 and the second virtual switch VS2. As shown in FIG. 7, in order to create the template image of the second management host 122, all the PCIe devices (except for the first management host 121) are initially connected to the second virtual switch VS2, and the second management host 122 boots up from the template kernel image until all the PCIe device drivers thereof are initialized. Thereafter, the second management host 122 suspends the template image partition thereof and then self-reboots (from the controller kernel image this time) and copies the template image disk partition to the running image disk partition. Afterward, the second management host 122 reboots again (from the controller kernel image this time), so as to monitor and control the condition of the first management host 121. The second management host 122 monitors and controls the condition of the first management host 121 by heartbeat messages.

When the second management host 122 finishes the template kernel and reboots from the controller kernel image, all the PCIe devices (except for the second management host 122) are reallocated to the first virtual switch VS1, and the first management host 121 boots from the template kernel image and continues running until all the PCIe device drivers thereof are initialized. Thereafter, the first management host 121 suspends the template image partition thereof and reboots (from the controller kernel image this time) and then copies the template kernel image disk partition to the running kernel image disk partition. Afterward, the first management host 121 reboots again (from the running kernel image this time) and the entire system starts to work, and the first management host 121 is in charge of PCIe management (root complex). To sum up, the first suspension/reboot of the first management host 121 is for creating and copying the template kernel image, and the second reboot of the first management host 121 is for running the system.

When the second management host 122 detects a failure of the first management host 121, the second management host 122 instructs all the other members (except for the first management host 121) of the first virtual switch VS1 to join the second virtual switch VS2 and uses the running kernel image of the second management host 122 to self-reboot (Step S542). Because the running kernel image of the second management host 122 already includes all the required PCIe device driver states (as described above), the second management host 122 is able to manage the PCIe devices and NTBs in the PCIe domain of the second virtual switch VS2 without resetting them. Before the second management host 122 self-reboots, members of the first virtual switch VS1 need to be reallocated to the second virtual switch VS2, or the reboot will fail because the device drivers in the running kernel image cannot find the corresponding devices. When the second management host 122 is rebooting, the service of the control plane is disrupted. The first management host 121 uses the controller kernel image to self-reboot and then copies the template kernel image disk partition thereof to the running kernel image disk partition (Step S543). After completing the copying, the first management host 121 reboots from the controller kernel image, so as to constantly monitor the condition of the second management host 122 (Step S544).

It should be noted that, in different application contexts, the related functions of the first management host 121, the second management host 122, the first NTB 141, and/or the second NTB 142 may be implemented as software, firmware, or hardware by using general programming languages (e.g. C or C++), hardware description languages (e.g. Verilog HDL or VHDL), or other suitable programming languages. The software (or firmware) capable of executing the related functions may be deployed as any known computer-accessible media, such as magnetic tapes, semiconductor memories, magnetic disks, and compact disks (e.g. CD-ROM or DVD-ROM), or the software (or firmware) may be transmitted through Internet, wired communication, wireless communication, or other communication media. The software (or firmware) may be stored in an accessible medium of a computer for the processor of the computer to access/execute the programming codes of the software (firmware). In addition, the system, device, and method of this disclosure may be implemented by a combination of hardware and software.

In conclusion of the above, the PCIe network system 100 and the operation method according to the exemplary embodiments of the disclosure provide a fault-tolerant PCIe-based area network architecture combined with a fail-over mechanism. The PCIe network system 100 and the operation method take the PCIe architecture and significantly reduce the service disruption time caused by failure of the PCIe root complex or PCIe link/switch. According to the application requirements, the PCIe network system 100 may be applied to a server rack to serve as a top of rack (TOR) switch, or applied to other environments.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A peripheral component interconnect express (PCIe) network system, comprising:
   a first management host;
   a PCIe switch, wherein a first upstream port of the PCIe switch is electrically coupled to the first management host;
   a first non-transparent bridge, disposed in the PCIe switch, electrically coupling to a first PCIe port of a first calculation host, wherein the first non-transparent bridge couples the first PCIe port of the first calculation host to the first management host; and
   a second non-transparent bridge, disposed in the PCIe switch, electrically coupling to a second PCIe port of the first calculation host, wherein the second non-transparent bridge couples the second PCIe port of the first calculation host to the first management host.

2. The PCIe network system according to claim 1, wherein a first extended memory address of the first management host is mapped to a local memory address of the first calculation host through the first non-transparent bridge of the PCIe switch, and a second extended memory address of the first management host is mapped to the local memory address of the first calculation host through the second non-transparent bridge of the PCIe switch.

3. The PCIe network system according to claim 1, wherein a first extended memory address of the first calculation host is mapped to a local memory address of the first management host through the first non-transparent bridge of the PCIe switch, and a second extended memory address of the first calculation host is mapped to the local memory address of the first management host through the second non-transparent bridge of the PCIe switch.

4. The PCIe network system according to claim 1, wherein a global memory address space of the first management host is defined as a plurality of address ranges, wherein a first address range of the address ranges is allocated to serve as local memory address of the first management host, the first management host accesses resources of local memory address of the first calculation host through the first non-transparent bridge of the PCIe switch by using a second address range of the address ranges, and the first management host accesses the resources of the local memory address of the first calculation host through the second non-transparent bridge of the PCIe switch by using a third address range of the address ranges.

5. The PCIe network system according to claim 1, wherein a global memory address space of the first calculation host is defined as a plurality of address ranges, wherein a first address range of the address ranges is allocated to serve as local memory address of the first calculation host, the first calculation host accesses resources of local memory address of the first management host through the first non-transparent bridge of the PCIe switch by using a second address range of the address ranges, and the first calculation host accesses the resources of the local memory address of the first management host through the second non-transparent bridge of the PCIe switch by using a third address range of the address ranges.

6. The PCIe network system according to claim 1, further comprising:
   a third non-transparent bridge, disposed in the PCIe switch, electrically coupling to a first PCIe port of a second calculation host, wherein the third non-transparent bridge couples the first PCIe port of the second calculation host to the first management host; and
   a fourth non-transparent bridge, disposed in the PCIe switch, electrically coupling to a second PCIe port of the second calculation host, wherein the fourth non-transparent bridge couples the second PCIe port of the second calculation host to the first management host.

7. The PCIe network system according to claim 6, wherein a first extended memory address of the first calculation host is mapped to a second extended memory address of the first management host through the first non-transparent bridge of the PCIe switch, the second extended memory address of the first management host is mapped to a local memory address of the second calculation host through the third non-transparent bridge of the PCIe switch, a third extended memory address of the first calculation host is mapped to a fourth extended memory address of the first management host through the second non-transparent bridge of the PCIe switch, and the fourth extended memory address of the first management host is mapped to the local memory address of the second calculation host through the fourth non-transparent bridge of the PCIe switch.

8. The PCIe network system according to claim 6, wherein a global memory address space of the first calculation host is defined as a plurality of address ranges, wherein a first address range of the address ranges is allocated to serve as local memory address of the first calculation host, the first calculation host accesses resources of local memory address of the second calculation host through the first non-transparent bridge of the PCIe switch and the first management host by using a second address range of the address ranges, and the first calculation host accesses the resources of the local memory address of the second calculation host through the second non-transparent bridge of the PCIe switch and the first management host by using a third address range of the address ranges.

9. The PCIe network system according to claim 1, further comprising:
   a second management host electrically coupled to a second upstream port of the PCIe switch, wherein when the second management host detects a failure of the first management host, the second management host performs a fail-over procedure to manage the PCIe switch in place of the first management host.

10. The PCIe network system according to claim 9, wherein the PCIe switch is divided into a plurality of virtual switches, wherein a first virtual switch of the virtual switches comprises the first upstream port and a second virtual switch of the virtual switches comprises the second upstream port, wherein when the first management host manages the PCIe switch, all downstream ports of the PCIe switch are allocated to the first virtual switch and the second virtual switch comprises the second upstream port.

11. The PCIe network system according to claim 10, wherein the fail-over procedure comprises:
controlling the PCIe switch by the second management host, all the downstream ports of the first virtual switch are changed to be allocated to the second virtual switch and the first virtual switch comprises the first upstream port;
self-rebooting the second management host by using a running kernel image of the second management host;
self-rebooting the first management host by using a controller kernel image of the first management host, and copying a template kernel image of the first management host as a running kernel image of the first management host; and
self-rebooting the first management host by using the controller kernel image of the first management host and monitoring a condition of the second management host.

12. An operation method of a PCIe network system, the operation method comprising:
disposing a first management host;
disposing a PCIe switch, wherein a first upstream port of the PCIe switch is electrically coupled to the first management host;
disposing a first non-transparent bridge in the PCIe switch for electrically coupling to a first PCIe port of a first calculation host;
disposing a second non-transparent bridge in the PCIe switch for electrically coupling to a second PCIe port of the first calculation host;
coupling the first PCIe port of the first calculation host to the first management host by the first non-transparent bridge; and
coupling the second PCIe port of the first calculation host to the first management host by the second non-transparent bridge.

13. The operation method of the PCIe network system according to claim 12, wherein a first extended memory address of the first management host is mapped to a local memory address of the first calculation host through the first non-transparent bridge of the PCIe switch, and a second extended memory address of the first management host is mapped to the local memory address of the first calculation host through the second non-transparent bridge of the PCIe switch.

14. The operation method of the PCIe network system according to claim 12, wherein a first extended memory address of the first calculation host is mapped to a local memory address of the first management host through the first non-transparent bridge of the PCIe switch, and a second extended memory address of the first calculation host is mapped to the local memory address of the first management host through the second non-transparent bridge of the PCIe switch.

15. The operation method of the PCIe network system according to claim 12, further comprising:
defining a global memory address space of the first management host as a plurality of address ranges;
allocating a first address range of the address ranges of the first management host to serve as local memory address of the first management host;
accessing resources of local memory address of the first calculation host by the first management host through the first non-transparent bridge of the PCIe switch by using a second address range of the address ranges; and
accessing the resources of the local memory address of the first calculation host by the first management host through the second non-transparent bridge of the PCIe switch by using a third address range of the address ranges.

16. The operation method of the PCIe network system according to claim 12, further comprising:
defining a global memory address space of the first calculation host as a plurality of address ranges;
allocating a first address range of the address ranges to serve as local memory address of the first calculation host;
accessing resources of local memory address of the first management host by the first calculation host through the first non-transparent bridge of the PCIe switch by using a second address range of the address ranges; and
accessing the resources of the local memory address of the first management host by the first calculation host through the second non-transparent bridge of the PCIe switch by using a third address range of the address ranges.

17. The operation method of the PCIe network system according to claim 12, further comprising:
disposing a third non-transparent bridge in the PCIe switch for electrically coupling to a first PCIe port of a second calculation host;
disposing a fourth non-transparent bridge in the PCIe switch for electrically coupling to a second PCIe port of the second calculation host;
coupling the first PCIe port of the second calculation host to the first management host by the third non-transparent bridge; and
coupling the second PCIe port of the second calculation host to the first management host by the fourth non-transparent bridge.

18. The operation method of the PCIe network system according to claim 17, wherein a first extended memory address of the first calculation host is mapped to a second extended memory address of the first management host through the first non-transparent bridge of the PCIe switch, the second extended memory address of the first management host is mapped to a local memory address of the second calculation host through the third non-transparent bridge of the PCIe switch, a third extended memory address of the first calculation host is mapped to a fourth extended memory address of the first management host through the second non-transparent bridge of the PCIe switch, and the fourth extended memory address of the first management host is mapped to the local memory address of the second calculation host through the fourth non-transparent bridge of the PCIe switch.

19. The operation method of the PCIe network system according to claim 17, further comprising:
defining a global memory address space of the first calculation host as a plurality of address ranges;
allocating a first address range of the address ranges to serve as local memory address of the first calculation host;
accessing resources of local memory address of the second calculation host by the first calculation host through the first non-transparent bridge of the PCIe switch and the first management host by using a second address range of the address ranges; and accessing the resources of the local memory address of the second calculation host by the first calculation host through the second non-transparent bridge of the PCIe switch and the first management host by using a third address range of the address ranges.

20. The operation method of the PCIe network system according to claim 12, further comprising:

disposing a second management host, wherein the second management host is electrically coupled to a second upstream port of the PCIe switch; and when the second management host detects a failure of the first management host, performing a fail-over procedure for the second management host to manage the PCIe switch in place of the first management host.

21. The operation method of the PCIe network system according to claim 20, further comprising:

dividing the PCIe switch into a plurality of virtual switches, wherein a first virtual switch of the virtual switches comprises the first upstream port and a second virtual switch of the virtual switches comprises the second upstream port; and when the first management host manages the PCIe switch, allocating all downstream ports of the PCIe switch to the first virtual switch, wherein the second virtual switch comprises the second upstream port.

22. The operation method of the PCIe network system according to claim 21, wherein the fail-over procedure comprises:

controlling the PCIe switch by the second management host, such that all the downstream ports of the first virtual switch are changed to be allocated to the second virtual switch and the first virtual switch comprises the first upstream port;

self-rebooting the second management host by using a running kernel image of the second management host;

self-rebooting the first management host by using a controller kernel image of the first management host, and copying a template kernel image of the first management host as a running kernel image of the first management host; and self-rebooting the first management host by using the controller kernel image of the first management host and monitoring a condition of the second management host.

23. A peripheral component interconnect express (PCIe) network system, comprising:

a PCIe switch;

a first management host electrically coupled to a first upstream port of the PCIe switch;

a second management host electrically coupled to a second upstream port of the PCIe switch; and a first non-transparent bridge, disposed in the PCIe switch, electrically coupling to a PCIe port of a first calculation host, wherein when the first management host manages the PCIe switch, the first non-transparent bridge couples the PCIe port of the first calculation host to the first management host; and when the second management host detects a failure of the first management host, the second management host performs a fail-over procedure to manage the PCIe switch in place of the first management host, such that the first non-transparent bridge changes to couple the PCIe port of the first calculation host to the second management host.

24. The PCIe network system according to claim 23, wherein a first extended memory address of the first management host is mapped to a local memory address of the first calculation host through the first non-transparent bridge of the PCIe switch.

25. The PCIe network system according to claim 23, wherein a first extended memory address of the first calculation host is mapped to a local memory address of the first management host through the first non-transparent bridge of the PCIe switch.

26. The PCIe network system according to claim 23, wherein a global memory address space of the first management host is defined as a plurality of address ranges, wherein a first address range of the address ranges is allocated to serve as local memory address of the first management host, and the first management host accesses resources of local memory address of the first calculation host through the first non-transparent bridge of the PCIe switch by using a second address range of the address ranges.

27. The PCIe network system according to claim 23, wherein a global memory address space of the first calculation host is defined as a plurality of address ranges, wherein a first address range of the address ranges is allocated to serve as local memory address of the first calculation host, and the first calculation host accesses resources of local memory address of the first management host through the first non-transparent bridge of the PCIe switch by using a second address range of the address ranges.

28. The PCIe network system according to claim 23, further comprising:

a second non-transparent bridge, disposed in the PCIe switch, electrically coupling to a PCIe port of a second calculation host, wherein when the first management host manages the PCIe switch, the second non-transparent bridge couples the PCIe port of the second calculation host to the first management host; and when the second management host manages the PCIe switch in place of the first management host, the second non-transparent bridge changes to couple the PCIe port of the second calculation host to the second management host.

29. The PCIe network system according to claim 28, wherein a first extended memory address of the first calculation host is mapped to a second extended memory address of the first management host through the first non-transparent bridge of the PCIe switch, and the second extended memory address of the first management host is mapped to a local memory address of the second calculation host through the second non-transparent bridge of the PCIe switch.

30. The PCIe network system according to claim 28, wherein a global memory address space of the first calculation host is defined as a plurality of address ranges, wherein a first address range of the address ranges is allocated to serve as local memory address of the first calculation host, and the first calculation host accesses resources of local memory address of the second calculation host through the first non-transparent bridge of the PCIe switch and the first management host by using a second address range of the address ranges.

31. The PCIe network system according to claim 23, wherein the PCIe switch is divided into a plurality of virtual switches, wherein a first virtual switch of the virtual switches comprises the first upstream port and a second virtual switch of the virtual switches comprises the second upstream port, wherein when the first management host manages the PCIe switch, all downstream ports of the PCIe switch are allocated to the first virtual switch and the second virtual switch comprises the second upstream port.

32. The PCIe network system according to claim 31, wherein the fail-over procedure comprises:
controlling the PCIe switch by the second management host, such that all the downstream ports of the first virtual switch are changed to be allocated to the second virtual switch and the first virtual switch comprises the first upstream port;
self-rebooting the second management host by using a running kernel image of the second management host;
self-rebooting the first management host by using a controller kernel image of the first management host, and copying a template kernel image of the first management host as a running kernel image of the first management host; and
self-rebooting the first management host by using the controller kernel image of the first management host and monitoring a condition of the second management host.

33. An operation method of a PCIe network system, the operation method comprising:
disposing a PCIe switch;
disposing a first management host, wherein the first management host is electrically coupled to a first upstream port of the PCIe switch;
disposing a second management host, wherein the second management host is electrically coupled to a second upstream port of the PCIe switch;
disposing a first non-transparent bridge in the PCIe switch for electrically coupling to a PCIe port of a first calculation host;
when the first management host manages the PCIe switch, coupling the PCIe port of the first calculation host to the first management host by the first non-transparent bridge; and
when the second management host detects a failure of the first management host, performing a fail-over procedure by the second management host to manage the PCIe switch in place of the first management host, such that the first non-transparent bridge changes to couple the PCIe port of the first calculation host to the second management host.

34. The operation method of the PCIe network system according to claim 33, wherein a first extended memory address of the first management host is mapped to a local memory address of the first calculation host through the first non-transparent bridge of the PCIe switch.

35. The operation method of the PCIe network system according to claim 33, wherein a first extended memory address of the first calculation host is mapped to a local memory address of the first management host through the first non-transparent bridge of the PCIe switch.

36. The operation method of the PCIe network system according to claim 33, further comprising:
defining a global memory address space of the first management host as a plurality of address ranges;
allocating a first address range of the address ranges to serve as local memory address of the first management host; and
accessing resources of local memory address of the first calculation host by the first management host through the first non-transparent bridge of the PCIe switch by using a second address range of the address ranges.

37. The operation method of the PCIe network system according to claim 33, further comprising:
defining a global memory address space of the first calculation host as a plurality of address ranges;
allocating a first address range of the address ranges to serve as local memory address of the first calculation host; and
accessing resources of local memory address of the first management host by the first calculation host through the first non-transparent bridge of the PCIe switch by using a second address range of the address ranges.

38. The operation method of the PCIe network system according to claim 33, further comprising:
disposing a second non-transparent bridge in the PCIe switch for electrically coupling to a PCIe port of a second calculation host, wherein
when the first management host manages the PCIe switch, coupling the PCIe port of the second calculation host to the first management host by the second non-transparent bridge; and
when the second management host manages the PCIe switch in place of the first management host, changing to couple the PCIe port of the second calculation host to the second management host by the second non-transparent bridge.

39. The operation method of the PCIe network system according to claim 38, wherein a first extended memory address of the first calculation host is mapped to a second extended memory address of the first management host through the first non-transparent bridge of the PCIe switch, and the second extended memory address of the first management host is mapped to a local memory address of the second calculation host through the second non-transparent bridge of the PCIe switch.

40. The operation method of the PCIe network system according to claim 38, further comprising:
defining a global memory address space of the first calculation host as a plurality of address ranges;
allocating a first address range of the address ranges to serve as local memory address of the first calculation host; and
accessing resources of local memory address of the second calculation host by the first calculation host through the first non-transparent bridge of the PCIe switch and the first management host by using a second address range of the address ranges.

41. The operation method of the PCIe network system according to claim 33, further comprising:
dividing the PCIe switch into a plurality of virtual switches, wherein a first virtual switch of the virtual switches comprises the first upstream port and a second virtual switch of the virtual switches comprises the second upstream port; and
when the first management host manages the PCIe switch, allocating all downstream ports of the PCIe switch to the first virtual switch, wherein the second virtual switch comprises the second upstream port.

42. The operation method of the PCIe network system according to claim 41, wherein the fail-over procedure comprises:
controlling the PCIe switch by the second management host, such that all the downstream ports of the first virtual switch are changed to be allocated to the second virtual switch and the first virtual switch comprises the first upstream port;

self-rebooting the second management host by using a running kernel image of the second management host;

self-rebooting the first management host by using a controller kernel image of the first management host, and copying a template kernel image of the first management host as a running kernel image of the first management host; and self-rebooting the first management host by using the controller kernel image of the first management host and monitoring a condition of the second management host.

* * * * *